April 9, 1935.  H. NUTT  1,997,265

AUTOMATIC CLUTCH

Filed March 9, 1932  4 Sheets-Sheet 1

Inventor
Harold Nutt.

April 9, 1935. H. NUTT 1,997,265
AUTOMATIC CLUTCH
Filed March 9, 1932 4 Sheets-Sheet 2

Inventor
Harold Nutt,
by Charles Hill
Attys.

April 9, 1935.　　　　H. NUTT　　　　1,997,265
AUTOMATIC CLUTCH
Filed March 9, 1932　　　4 Sheets-Sheet 4

Inventor
Harold Nutt.

Patented Apr. 9, 1935

1,997,265

UNITED STATES PATENT OFFICE 1,997,265

AUTOMATIC CLUTCH

Harold Nutt, Chicago, Ill., assignor to The Borg & Beck Company, Chicago, Ill., a corporation of Illinois Application March 9, 1932, Serial No. 597,691

16 Claims. (Cl. 192—105)

This invention relates to automatically operating clutches of the centrifugal type wherein the clutch automatically engages at a predetermined rotative speed. While the chosen embodiment of the invention relates to automotive clutches, it will be understood that the clutch of my invention can be used for other purposes.

It is an object of this invention to provide an improved automatically operating clutch having a graduated engagement wherein centrifugal weights cause the clutch to initially engage when the driving member reaches a predetermined speed, a second set of weights responding to a further increase in speed to build up the engaging pressure to a predetermined maximum pressure. Centrifugally operated clutches have been proposed heretofore but have not been successful in automotive service, for example, because of the wide range of normal operating speeds above the necessarily low speed at which full initial engagement is required. If the centrifugally operative mechanism is made sufficiently sensitive to pick up and carry full load at the desired low speed slightly above idling, then the clutch action will be too abrupt or harsh at higher speeds or for more rapid acceleration than usual. Also centrifugal force builds up rapidly at higher speeds greatly overloading the clutch operating mechanism unless provision is made to limit the maximum pressure. It is accordingly believed to be an important advantage of my invention that the clutch pressure is limited to a predetermined pressure fully attained at a relatively low speed and thereafter unaffected by further increases in the centrifugal force developed by the higher operating speeds. I accomplish this result by providing two sets of centrifugally responsive weights which act against separate spring loaded rings which come into cumulative action over a narrow speed range and are limited in movement by a housing which takes any excess force developed by the weights. The spring loaded rings press in turn on the normal clutch pressure plate so that the forces developed by the weights are transmitted to the pressure plate through springs, the pre-loading of which can be selected to obtain any desired maximum pressure on the pressure plate, which maximum pressure is obtainable at rotative speeds only moderately in excess of the relatively low initial engaging speed, and is thereafter unaffected by further increases in rotative speed.

It is a further object of this invention to provide an improved clutch of the type described wherein a manual throwout mechanism is provided for retracting the pressure plate, this mechanism being required to only overcome the maximum spring pressure which approximates that of the same capacity clutch without the automatic feature. Thus the force required to manually disengage the clutch at even the highest rotative speeds is no greater than in a conventional clutch of equal capacity since the manual throwout mechanism is not required to retract the centrifugal weights.

It is also an important object of this invention to provide an automatic clutch actuated by centrifugal weights formed as groups of thin stampings radially disposed and held in position in the usual clutch housing by centrifugal force, the weights being pivoted in a corner of the housing and not in any way pinned or otherwise attached to the members against which they operate, the weights being aligned and grouped by peripheral notches in the members against which they operate, and guided by radial lugs on the clutch pressure plate. Thus the clutch design is rendered flexible since it readily permits an increase or decrease in either set of weights used and can therefore be readily varied in the engagement rate and adapted to a reasonably wide range of engine sizes by variation of either set of the weights used, the retraction forces imposed thereon, and the pre-loading of the pressure springs against which the weights operate.

It is still another object of this invention to provide an improved and simplified automatic clutch that can be economically manufactured, and easily serviced to compensate for normal wear in use. Also, since the automatic clutch utilizes many features of a conventional manually operated clutch, an existing conventional clutch can be economically converted into the automatic clutch of this invention with the minimum labor and wastage of parts.

Other and further important objects of this invention will be apparent from the disclosures in the specification and the accompanying drawings.

This invention, in a preferred form, is illustrated in the drawings and hereinafter more fully described.

Figure 1:
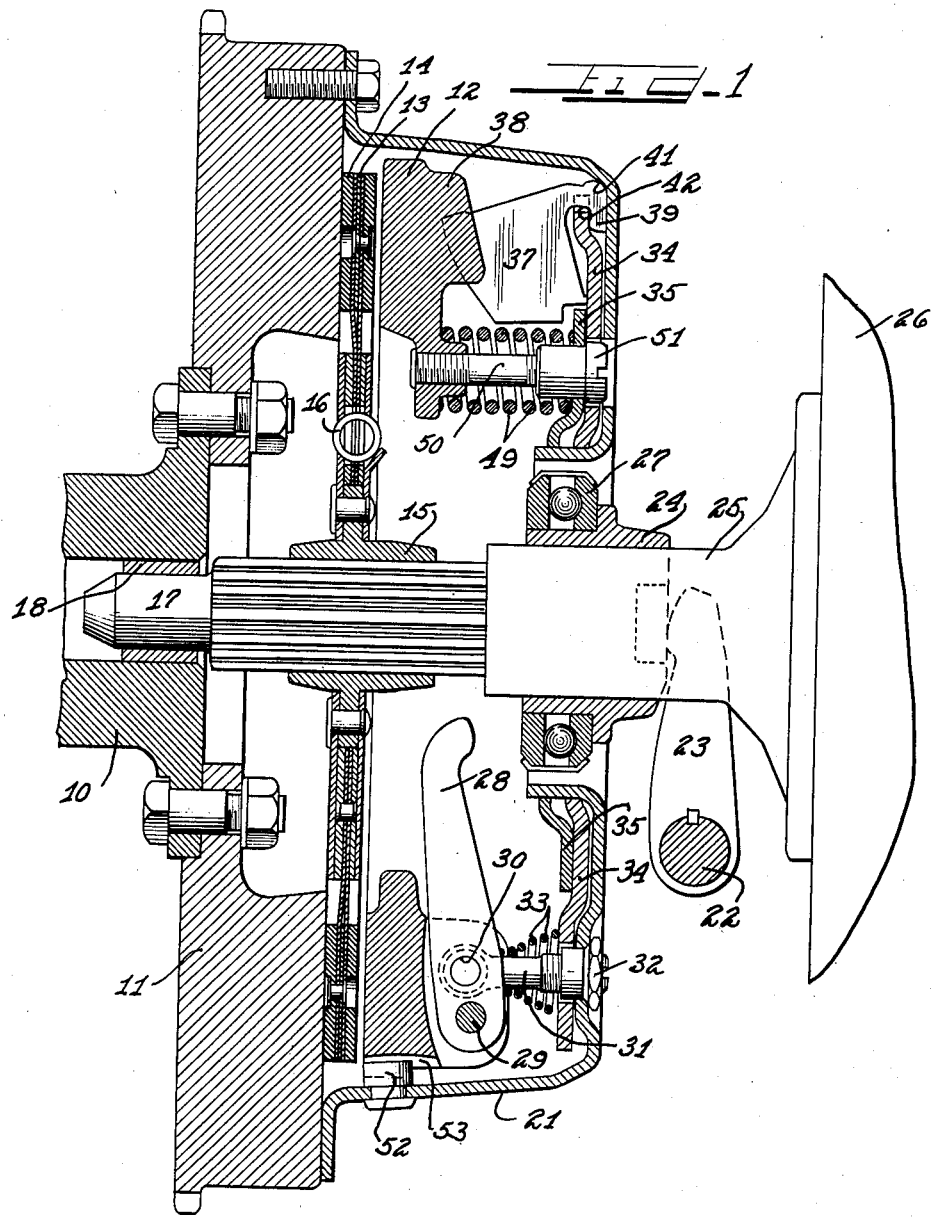
Figure 1 is an irregular longitudinal section corresponding to the section line I—I in Figure 4 showing an embodiment of this invention in the fully released position.

As shown:

The automotive type of clutch chosen to illustrate one embodiment of this invention is of the single plate type although it is to be understood that my invention is not to be limited in application to the particular combination of conventional elements disclosed. As illustrated, an engine crankshaft 10 carries a flywheel 11, the rear face of which acts as one surface of the clutch driving member, an axially movable pressure plate 12 serving to press a clutch disc 13 against the flywheel 11. The clutch disc carries the usual facing material 14 on both sides and is yieldingly connected to its hub 15 by springs 16 which serve to avoid the transmission of torsional vibrations. A transmission drive shaft 17 which forms the driven shaft of the clutch is provided with splines on which the hub 15 slides and the shaft is journaled at its front end in a pilot bearing 18 axially located in the crankshaft. The pressure plate 12 and the operating mechanism therefor is enclosed in a casing or housing 21 bolted to the rear face of the flywheel.

The foregoing described structure is substantially the same as the well known Borg & Beck manually operated clutch wherein the pressure plate is urged against the clutch disc by spring pressure and is retracted by means of the usual clutch throwout lever acting on a shaft 22 having a fork 23 keyed thereto to shift a sliding collar 24 to the left on a sleeve 25 enveloping the clutch shaft 17 and secured to the transmission case 26. The collar 24 carries a thrust bearing 27 which contacts throwout fingers 28 pivoted at 29 to the pressure plate and fulcrumed at 30 in an adjustable eye bolt 31 having a nut 32 seated in the housing. The eye bolt carries a spring 33 bearing against the lever 28 to take up play therein. The adjusting nuts 32 are primarily provided to permit proper setting of the throwout fingers during manufacturing operations, but may be readjusted for wear in the clutch which might otherwise eventually require too great a travel of the clutch lever to secure full disengagement. Thus the clutch of this invention is manually operable in exactly the same way as the conventional clutch and has many parts in common therewith so that a manual clutch of the type described can be altered to embody this invention by the substitution and addition of the automatically operating mechanism to be now described.

Figure 2:
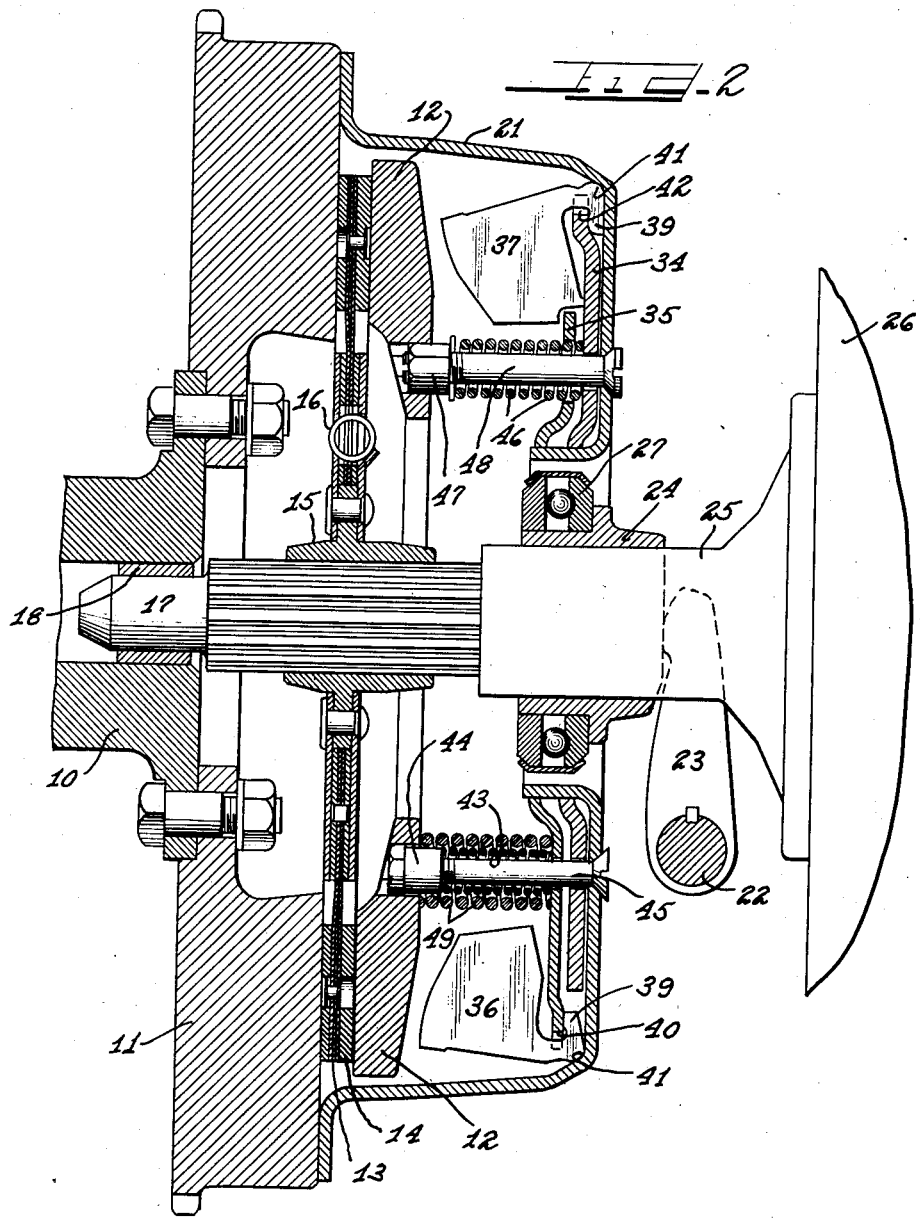
Figure 2 is an irregular longitudinal section corresponding to the section line II—II in Figure 4 showing the clutch in the first stage of engagement.
Figure 3:
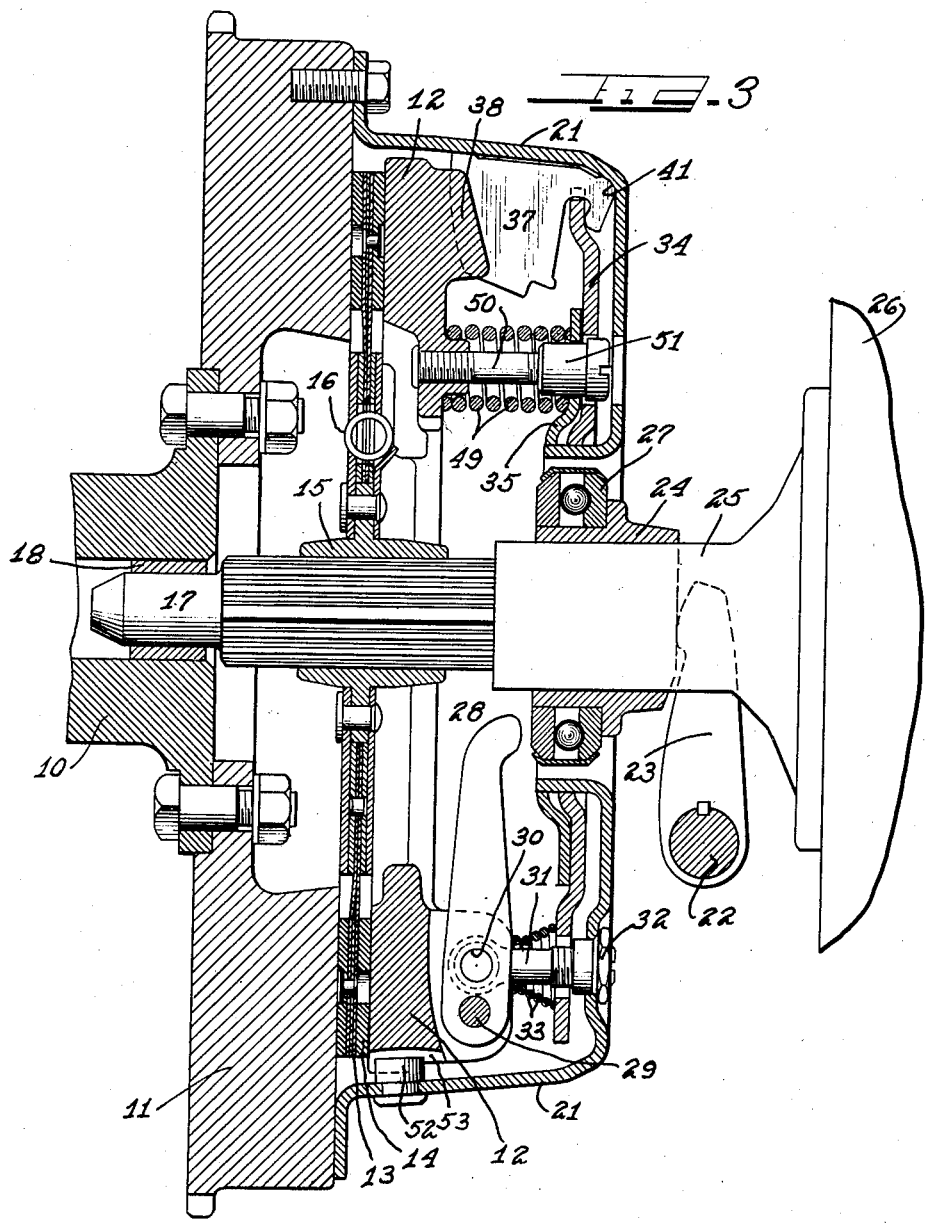
Figure 3 is a section corresponding to Figure 1 showing the clutch fully engaged.

Two spring mounting rings or spiders are provided, an outer secondary ring 34 which is adjacent the inner surface of the clutch housing 21 when the clutch is disengaged as in Figure 1, and an inner primary ring 35 normally seated thereon. This is because two distinct stages of operation are provided, the primary spring ring 35 shifting into the position of Figure 2 at a predetermined rotary speed, followed by the secondary spring ring 34 at a higher rotative speed as shown in Figure 3, the secondary ring thus supplementing the primary spring ring to provide full engagement after a predetermined increase in rotative speed.

The spring rings 35 and 34 are advanced to the left by groups of weights 36 and 37 respectively. In the embodiment shown three groups of weights 36 as shown in the lower part of Figure 2 are conveniently formed as a plurality of thin stampings guided between bosses 38 on the pressure plate and having extension lugs 39 hooked over the back of the spring ring 35 in notches 40 in the periphery thereof, the heel 41 of the lugs being rounded and fulcrumed or bearing in the fillet at the corner of the housing. The weights are not restrained or pinned otherwise than by the housing and spring ring, and swing outwardly about the heel as a pivot until they contact against the housing under the action of centrifugal force, the swinging movement causing the toe of the lugs 39 to pry the spring ring to the left. A second set of six groups of weights 37 have the same lug structure and are hooked over notches 42 in the periphery of the secondary ring 34 to operate in the same way, under the action of centrifugal force, to pry the secondary ring 34 to the left.

The primary and secondary rings are normally urged to the right in the figures by separate sets of retractor springs. In the disclosed embodiment of the invention three springs 43 are provided to act against the primary ring 35, these springs being located between the ring and nuts 44 on bolts 45, the heads of which seat on the housing as shown in the lower part of Figure 2. The secondary ring 34 is similarly retracted by six springs 46 located between the ring and nuts 47 on bolts 48, the heads of which also seat on the housing. Thus the secondary retractor springs 46 exert considerably greater total pressure than the primary retractor springs 43 and since both sets of springs resist the response of their associated weights the primary set of weights will respond to a lower rotative speed than the secondary set of weights. Since the spring forces are predetermined and can be varied by adjustments of the bolts and nuts the slip range of the clutch, between initial and complete engagement can be varied within wide limits to suit the requirements of different installations.

It is to be noted that the retractor springs do not bear against the pressure plate, their sole function being to control the operation of the centrifugal weights and to move the spring rings to the right when the rotative speed drops below the predetermined speeds at which each ring operates.

Figure 4:
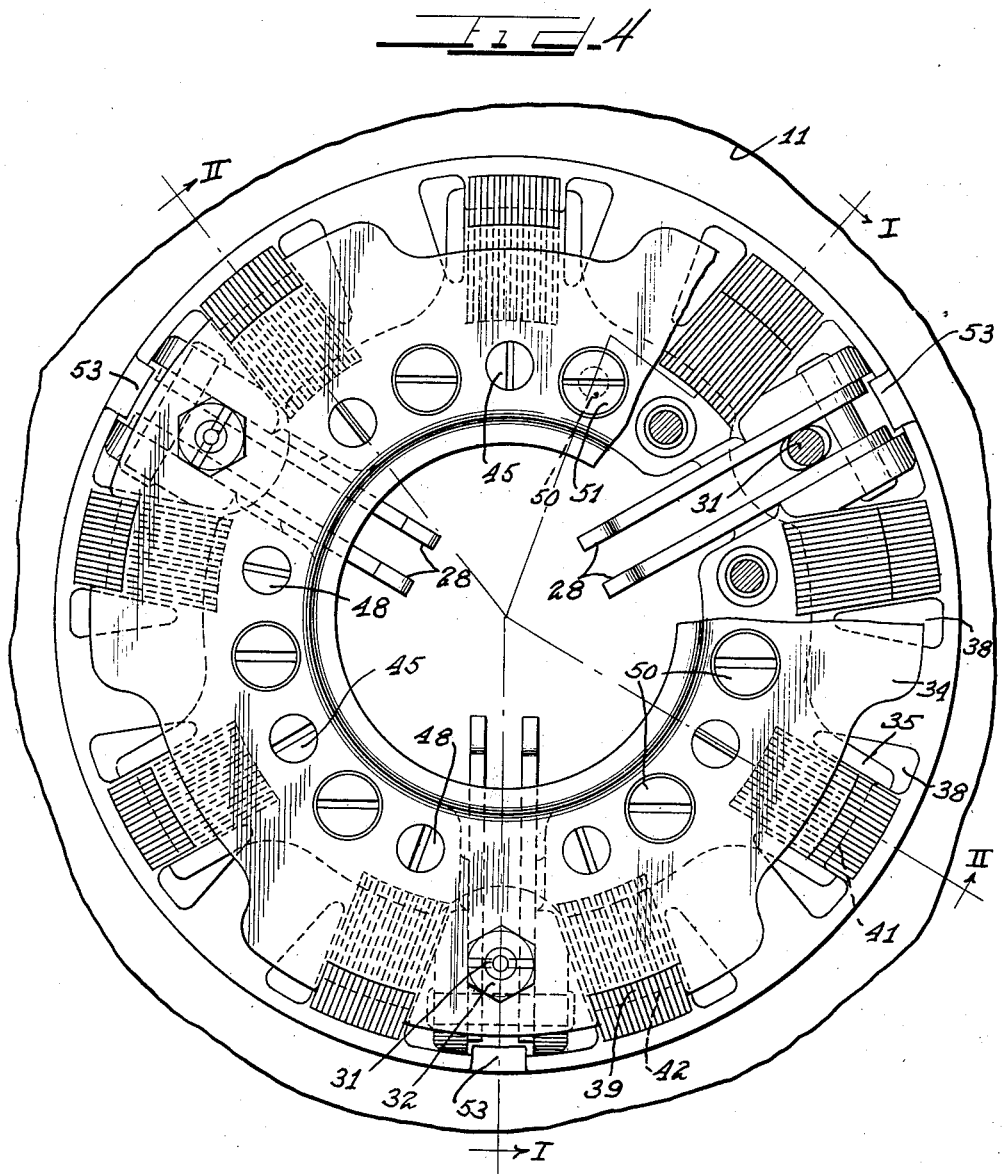
Figure 4 is a rear view partly broken away of the clutch driving elements with the housing and driven elements omitted.

A third group of 9 springs 49 shown in the upper part of Figure 1 and as enveloping the spring 43 in the lower part of Figure 2, are interposed between the pressure plate and the primary spring ring 35. Six of these springs as shown in Figures 1 and 3 have studs 50 disposed therein and secured to the pressure plate, the free end of the studs carrying a nut 51 which engages the back or right side of the primary spring ring 35. Thus there are nine pressure springs disposed in groups of three as shown in Figure 4, the outer springs of each group having the adjusting studs 50 therein. These studs are provided to secure parallelism of the pressure plate relative to the clutch disc and flywheel, and may also be utilized to control running clearness, while the nine pressure springs are so designed as to obtain an initial pre-loading to the desired total pressure. Thus if the centrifugal weights and the studs 50 were omitted a fully operative manual release clutch would result as the nine pressure springs are loaded to the desired engaging pressure to carry the designed torque. With the addition of the centrifugal weights and studs the clutch becomes automatic in action although the pressure is limited to that of the equivalent manual clutch no matter how great the centrifugal force becomes at high rotative speeds since the weights swing out against the housing and transmit any excess forces directly thereto without further effect on the automatic operation or manual release of the clutch.

The clutch is so proportioned that engagement occurs in two stages, the first stage involving the movement of the pressure plate and primary spring ring to the left as a unit without further compressing the pressure spring at a rotative speed corresponding to the adjustment of the retractor springs 43. During this stage the clutch running clearances are taken up and an initial light engagement of the clutch accomplished due to a partial outward movement of the primary centrifugal weights against the resistance of the retractor springs 43. The partial clutch engagement so accomplished serves to gradually pick up the load and a further increase of engine speed, after the clutch clearances have been so taken up, serves to energize the secondary centrifugal weights against the resistance of the secondary retractor springs 46 to move the secondary spring ring 34 to the left. Up to this point while the pressure springs remain unaltered in length yet in practice the pressure developed is sufficient to carry normal torque. A further increase in rotative speed causes the both sets of weights to swing out against the housing, shifting both spring rings further to the left into the position of Figure 3 where the pre-loading of the pressure springs is transferred from the bolt heads 51 to the pressure plate to secure the full designed engaging pressure, which is sufficient to assure against slippage under abnormal conditions.

It should be noted that all the clutch elements, with the exception of the clutch shaft and disc and the throwout bearing, revolve with the flywheel, and in order to relieve the connecting studs between the pressure plate and the housing or spring ring from torsional strains incident to clutch engagement it is desirable to provide guide keys or buttons 52 in the housing which engage in guide slots 53 in the periphery of the pressure plate.

While the illustrated clutch closely resembles a conventional type of manually controlled clutch, and may have the same characteristics of clutch pressure and throwout mechanism, it differs therefrom in that it is automatically and smoothly engaged through a predetermined range of rotative speeds by means of centrifugal force which swings the two sets of weights outwardly successively from the position of Figure 1 to that of Figure 3, causing a movement of the spring rings to the left in the figures, towards the flywheel and clutch disc. The spring rings are normally held in the position of Figure 1 by the two sets of retractor springs and the spring rings in turn normally hold the pressure plate in fixed relationship wherein the pressure springs are compressed to a desired initial pre-loading by means of the studs 50 and nuts 51.

At a predetermined speed, adjusted by the primary retractor spring bolts 44, the tendency of the weights 36 to swing outwardly into the position of Figure 2 overcomes the load of the retractor springs and moves the primary spring ring 35 and pressure plate assembly to the left as a unit until the clutch disc, backed by the flywheel opposes further motion of the pressure plate. A further increase in centrifugal force affects the secondary weights 37 to bring the secondary spring ring 34 into action. Thereafter, further outward movements of both sets of weights in response to increased speed can still further advance the spring rings to the left but since the pressure plate is engaged with and driving the clutch disc, the spring rings move up on the studs 50 clearing the nuts 51 and thus bringing the full pre-loading pressure of the nine pressure springs into action to further press the pressure ring against the clutch disc. Beyond the point where both sets of weights swing out against the housing as in Figure 3 no further increase in clutch pressure will occur as the result of increased rotative speeds and centrifugal force so that the total plate pressure is fully and exactly determined by the initial pre-loading of the pressure springs and is chosen to suit the engine characteristics and torque just as in the corresponding fully manually operated clutch; consequently the maximum capacity of the clutch can be accurately predetermined since it is unaffected by variations in the centrifugal force beyond that force required to secure full engagement. A corollary of this important advantage is that the manual throwout mechanism merely has to overcome the total spring pressure exactly as in the common form of conventional clutches. It is of course desirable that the centrifugal weights be capable of developing full clutch engagement at moderate engine speeds, but since the slip range of the clutch is under control this problem offers no difficulty in the present design because there is more than ample provision for weight space at the periphery of the clutch where the weights are also most effective.

From the foregoing description it will be evident that the clutch can be thrown out by the usual foot operated mechanism at engine speeds above the point where the clutch engages automatically, and that the load on the pedal required for making this release need not exceed that in an equivalent conventional clutch of the same capacity since in both types, the clutch throwout works against pressure springs the pre-loading of which determines the clutch capacity.

I am aware that many changes may be made and numerous details of construction may be varied through a wide range without departing from the principles of this invention, and I, therefore, do not purpose limiting the patent granted hereon otherwise than necessitated by the prior art.

I claim as my invention:

1. An automatic clutch comprising a driving member, a driven member, a pressure plate revolving with the driving member and movable to engage the driven member, a spring ring also revolving with the driving member, spring means interposed between said pressure plate and said spring ring, means for pre-loading said springs to a desired clutch engaging pressure, a second spring ring backing up the first mentioned spring ring, means for normally holding said spring rings and pressure plate out of engagement with the driven member, and centrifugal means for separately advancing the two spring rings to move said pressure plate into engagement with the driven member in stages over a predetermined range of rotative speeds of the driving member.

2. An automatic clutch comprising a driving member, a driven member, a pressure plate revolving with the driving member and movable to engage the driven member, a spring ring also revolving with the driving member, spring means interposed between said pressure plate and said spring ring, means for pre-loading said springs to a desired clutch engaging pressure, a second spring ring backing up the first mentioned spring ring, means for normally holding said spring rings and pressure plate out of engagement with the driven member, and centrifugal means for separately advancing the spring rings to move said pressure plate into engagement with the driven member in stages over a predetermined range of rotative speeds of the driving member, and manually operable means engaging said pressure plate to retract the same at will regardless of the position of said centrifugal means.

3. An automatic clutch comprising a driving member, a driven member, a pressure plate revolving with the driving member and movable to engage the driven member, a primary spring ring also revolving with the driving member, spring means interposed between said pressure plate and said primary spring ring, means for pre-loading said springs to a desired clutch engaging pressure, a secondary spring ring backing up said primary spring, means for normally holding said spring rings and pressure plate out of engagement with the driven member, a plurality of radially disposed weights so formed as to engage behind the spring rings and adapted to successively swing outwardly at different rotative speeds to cumulatively force the spring rings, spring means and pressure plate towards the driven member in stages over a predetermined range of rotative speeds of the driving member.

4. An automatic clutch comprising a driving member, a driven member, a pressure plate revolving with the driving member and movable to engage the driven member, a primary spring ring also revolving with the driving member, spring means interposed between said pressure plate and said primary spring ring, means for pre-loading said springs to a desired clutch engaging pressure, a secondary spring ring backing up said primary spring ring, means for normally holding said spring rings and pressure plate out of engagement with the driven member, a plurality of radially disposed weights so formed as to engage behind the spring rings and adapted to successively swing outwardly to force the spring rings, spring means and pressure plate towards the driven member in stages over a predetermined range of rotative speed of the driving member, and manually operable means engaging said pressure plate to retract the same at will regardless of the position of said weights.

5. An automatic clutch comprising a driving member, a driven member, a pressure plate revolving with the driving member and movable to engage the driven member, a primary spring ring also revolving with the driving member, spring means interposed between said pressure plate and said primary spring ring, means for pre-loading said springs to a desired clutch engaging pressure, a secondary spring ring backing up said primary spring ring, means for normally holding said spring rings and pressure plate out of engagement with the driven member, a housing enveloping the pressure plate and spring ring and secured to the driving member, and centrifugally responsive weights having lugs hooked between each of the spring rings and the housing, said lugs being adapted to successively advance the spring rings towards the driven member upon an outward swing of said weights under the influence of centrifugal force.

6. An automatic clutch comprising a driving member, a driven member, a pressure plate revolving with the driving member and movable to engage the driven member, a primary spring ring also revolving with the driving member, spring means interposed between said pressure plate and said primary spring ring, means for pre-loading said springs to a desired clutch engaging pressure, a secondary spring ring supplementing the primary spring rings, means for normally holding said spring rings and pressure plate out of engagement with the driven member, a housing enveloping the pressure plate and spring ring and secured to the driving member, and centrifugally responsive weights having lugs hooked between each of the spring rings and the housing, said lugs being adapted to successively advance the spring rings towards the driven member upon an outward swing of said weights under the influence of centrifugal force, and manually operable means engaging said pressure plate to retract the same at will regardless of the position of said weights.

7. An automatic clutch comprising a driving member, a driven member, a pressure plate revolving with the driving member and movable to engage the driven member, a primary spring ring also revolving with the driving member, spring means interposed between said pressure plate and said primary spring ring, means for pre-loading said springs to a desired clutch engaging pressure, a secondary spring ring supplementing the primary spring ring, means for normally holding said spring rings and pressure plate out of engagement with the driven member, a housing enveloping the pressure plate and spring rings and secured to the driving member, and centrifugally responsive weights pivoted within the housing, a portion of the weights having lugs hooked between each of the spring rings and the housing, said lugs adapted to advance the spring rings in succession towards the driving member upon an outward swing of said weights under the influence of a predetermined range of centrifugal force.

8. An automatic clutch comprising a driving member, a driven member, a pressure plate revolving with the driving member and movable to engage the driven member, a primary spring ring also revolving with the driving member, spring means interposed between said pressure plate and said primary spring ring, means for pre-loading said springs to a desired clutch engaging pressure, a secondary spring ring supplementing the primary spring ring, means for normally holding said spring rings and pressure plate out of engagement with the driven member, a housing enveloping the pressure plate and spring rings and secured to the driving member, and two sets of centrifugally responsive weights pivoted within the housing each set having lugs hooked between one of the spring rings and the housing, said lugs adapted to advance the spring rings in succession towards the driven member upon an outward swing of said weights under the influence of a predetermined range of centrifugal force, and manually operable means engaging said pressure plate to retract the same at will regardless of the position of said weights.

9. An automatic clutch comprising a driving member, a driven member, a pressure plate revolving with the driving member and movable to engage the driven member, a primary spring ring also revolving with the driving member, pressure means interposed between said pressure plate and said primary spring ring, means for preloading said pressure means to a desired clutch engaging pressure, a secondary spring ring supplementing the primary spring ring, means for normally holding said spring rings and pressure plate out of engagement with the driven member, a housing enveloping the pressure plate and spring ring and secured to the driving member, and groups of centrifugally responsive weights radially disposed at the periphery of the spring ring part of said groups having lugs hooked between each of the spring rings and the housing, said lugs being adapted to successively advance the spring rings towards the driven member upon an outward swing of said weights under the influence of a predetermined range of centrifugal force.

10. An automatic clutch comprising a driving member, a driven member, a pressure plate revolving with the driving member and movable to engage the driven member, a primary spring ring also revolving with the driving member, springs interposed between said pressure plate and said primary spring ring, means for preloading said springs to a desired clutch engaging pressure, a secondary spring ring supplementing the primary spring ring, means for normally holding said spring rings and pressure plate out of engagement with the driven member, a housing enveloping the pressure plate and spring ring and secured to the driving member, and a plurality of centrifugally responsive weights radially disposed at the periphery of the spring ring part of said weights having lugs hooked between each of the spring rings and the housing, said lugs being adapted to successively advance the spring rings towards the driven member upon an outward swing of said weights under the influence of a predetermined range of centrifugal force, and manually operable means engaging said pressure plate to retract the same at will regardless of the position of said weights.

11. An automatic clutch comprising a driving member, a driven member, a pressure plate movable to clamp the driving and driven members together, a housing enveloping the driven member and pressure plate and secured to the driving member, a spring mounting ring normally seating against said housing, retractor springs acting between the spring mounting ring and the housing, a second spring mounting ring normally seating against the first mentioned ring, pressure springs positioned between the second spring mounting ring and the pressure plate, and centrifugally responsive means adapted to sequentially shift the second and first spring mounting means away from the housing and towards the pressure plate to transfer the pressure spring load to the pressure plate.

12. An automatic clutch comprising a driving member, a driven member, a pressure plate movable to clamp the driving and driven members together, a housing enveloping the driven member and pressure plate and secured to the driving member, a spring mounting ring normally seating against said housing, retractor springs acting between the spring mounting ring and the housing, a second spring mounting ring normally seating against the first mentioned ring, pressure springs positioned between the second spring mounting ring and the pressure plate, means for normally withholding said spring loads from causing clutch engagement, and centrifugally responsive means adapted to sequentially transfer said pressure spring loads to said pressure plate to advance the pressure plate into clutching engagement over a predetermined range of rotative speed.

13. In a clutch including driving and driven members, spring loaded movable means for yieldingly engaging said members in driving relationship, and means for advancing said movable means with increasing force over a predetermined speed range, comprising a plurality of groups of centrifugally energizable weights for advancing said movable means, and retractor springs of unequal strength opposing each group of weights as a unit whereby the groups of weights will be successively energized in stages by increasing centrifugal forces as the speed of the driving member increases through a predetermined speed range.

14. In a clutch including driving and driven members, spring loaded movable means for yieldingly engaging said members in driving relationship, and means for advancing said movable means with increasing force over a predetermined speed range, comprising a plurality of groups of centrifugally energizable weights for advancing said movable means, and means opposing each group of weights as a unit, said means being adapted to yield thereto at successive increments in the centrifugal forces produced by increasing rotative speed through a predetermined speed range.

15. In a clutch comprising driving and driven members and clutch engaging means carried by each member, means for engaging the driving clutch engaging means in stages comprising means for preloading the engaging means to a desired total pressure, means normally retracting the engaging means, and a plurality of centrifugally responsive weights divided into groups operating in unison against different portions of the retracting means whereby the weights will respond in groups to different degrees of centrifugal force for overcoming the retracting means over a predetermined range of rotative speeds.

16. In a clutch comprising driving and driven members and clutch engaging means carried by each member, means for engaging the driving clutch engaging means in stages comprising means for preloading the engaging means to a desired total pressure, means normally retracting the engaging means, and a plurality of centrifugally responsive weights divided into groups operating in unison against different portions of the retracting means whereby the weights will respond in groups to different degrees of centrifugal force for overcoming the retracting means over a predetermined range of rotative speeds, and means for manually retracting said driving clutch engaging means against the action of the preloading means regardless of the action of said weights.

HAROLD NUTT.